Figure 2:
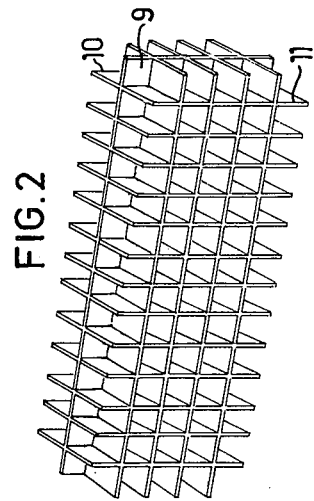

United States Patent [19]

Norlin

[11] 3,997,207
[45] Dec. 14, 1976

[54] CELLULAR SECTION FOR SHOCK ABSORPTION

[75] Inventor: Stig Ivar Norlin, Trollhattan, Sweden

[73] Assignee: Saab-Scania Aktiebolag, Sodertalje, Sweden

[22] Filed: July 1, 1975

[21] Appl. No.: 592,268

[30] Foreign Application Priority Data

July 4, 1974 Sweden ............................ 7408811

[52] U.S. Cl. ............................ 293/71 R; 267/140; 114/219
[51] Int. Cl.² ........................................ B60R 19/04
[58] Field of Search ...... 293/71 R, 71 P, 1, DIG. 3, 293/70; 267/139–140; 114/219; 188/1 C; 52/716–718

[56] References Cited

UNITED STATES PATENTS

| | | | |
|---|---|---|---|
| 2,998,214 | 8/1961 | Peterman | 188/1 C X |
| 3,512,822 | 5/1970 | Rich et al. | 293/1 |
| 3,587,787 | 6/1971 | Rich et al. | 188/1 C |
| 3,744,835 | 7/1973 | Carbone et al. | 293/1 |
| 3,809,420 | 5/1974 | Weller | 293/70 |
| 3,843,182 | 10/1974 | Walls et al. | 267/140 X |
| 3,926,462 | 12/1975 | Burns et al. | 293/70 X |

FOREIGN PATENTS OR APPLICATIONS 346,267    7/1972    Sweden ......................... 293/71 R

*Primary Examiner*—Robert B. Reeves
*Assistant Examiner*—Charles A. Marmor
*Attorney, Agent, or Firm*—Cushman, Darby & Cushman

[57] ABSTRACT

A cellular section for shock absorption having a longitudinal rear support side and a longitudinal front impact side. Between these sides there is a number of cells having their axis perpendicular to the support side. In a position between the support side and the impact side there is a longitudinal inner wall which constitutes a bottom for cells opening out backwards towards the support side and for cells opening out forwards towards the impact side. In this way each cell can stand a higher buckling load in impact, since the buckling length is reduced.

6 Claims, 5 Drawing Figures

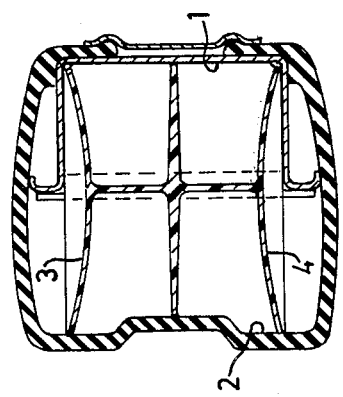
FIG. 4
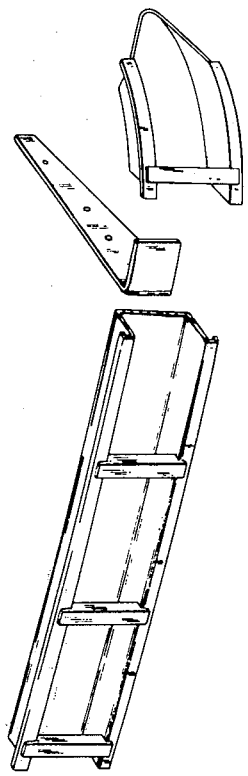
FIG. 5
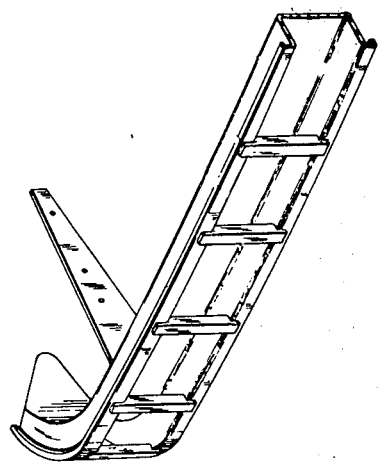

CELLULAR SECTION FOR SHOCK ABSORPTION

The present invention relates to a cellular section for shock absorption, said cellular section consisting of a semi-elastic or plastic material and having a longitudinal rear support side and a longitudinal front impact side and between these sides a number of transverse cells extending with their axis in a direction perpendicular to the support side, adjacent cells having at least one common side wall.

The use of cellular sections for shock absorption in bumpers on and for vehicles is previously known by, inter alia, Swedish patent 346 267. Said patent relates to a fender comprising a number of cellular sections abutting a rear beam, said cellular sections and beam being surrounded by an elastic protective casing which lends the bumper its outer form. The cellular sections have a substantially parallelepiped shape in order to fit as inserts into pocket-like recesses in the beam, said cellular sections, when in the mounted position, together forming a shock-absorbing unit which as least covers the total width of a vehicle. Each cellular section consists of a composite or molded unit of a semi-elastic or plastic material and has an end plate from which tubular cells project. Such a bumper having molded cellular sections of a plastics material has been found to have a good dampening effect for minor impacts. However, an increased dampening effect for cellular section constructions known to date requires an enlargement of the dimensions of the bumper in its entirety, an enlargement which, in terms of aesthetics and weight, is disadvantageous.

The main purpose of the present invention is to achieve a cellular section arrangement which provides increased dampening effect, yet maintains small outer dimensions.

This is made possible according to the invention by means of the cellular structure being provided with a longitudinal inner wall in a position between the support side and the impact side, which sides together define the width of the cellular structure, said inner wall constituting a common bottom for cells opening out backwards towards the support side and for cells opening out forwards towards the impact side.

Under normal conditions, the cellular section can be constructed out of a plastics material, for example polyethylene. However, for use in extreme temperatures, a cellular structure made out of rubber is preferable since a more even and better dampening effect is achieved therewith. The use of rubber sections is expediated in that cellular sections according to the invention have increased buckling strength as the inner wall arranged between the support side and the impact side divides the buckling length of the cellular section into two individual buckling lengths, the size of which is related to the size of those individual cells extending transversely along the same axis.

For use as insert-shaped cellular sections in bumpers according to Swedish Pat. No. 346 267, the cellular section according to the present invention is characterized in that its upper and lower outer limiting surfaces have a substantially concave shape across the width of the cellular section. This design results in that cells lying adjacent to such a limiting surface have a cross-section area which is successively reduced in a direction towards the inner wall, a situation which applies for both of the open cells extending outwards from each other in one and the same axial direction.

The transverse concavenesses are separated from each other in the longitudinal direction of the cellular section by means of a number of ribs, said ribs extending between the respective upper longitudinal edges of the support side and the impact side and between the respective lower longitudinal edges of the same surfaces. In cellular sections having the cells arranged in a crossruled pattern, said ribs constitute outer extensions of common separating walls for adjacent cells. Said ribs and said edges for the support side and the impact side provide the cellular section with a substantially rectangular outer profile in the transverse direction. The providing of the cellular section with concave guide surfaces and stiffening ribs makes possible such control of the deformation during shock absorption that the formation of bulges against the shank edges of a U-shaped beam holding the cellular structure is prevented, resulting in that the dampening ability of the material in the cellular section can be optimally taken advantage of.

Figure 3:
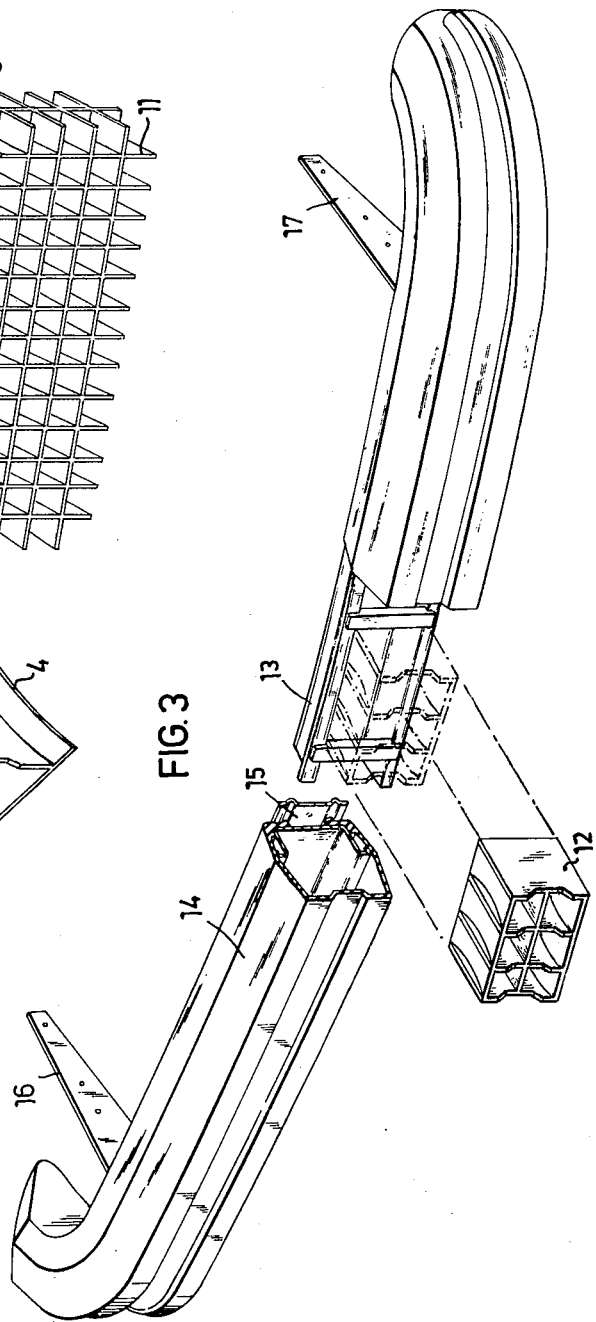

Other characteristics of the invention are revealed in the following description of two cellular sections for shock absorption, both being within the scope of the inventive idea. Reference is made to the enclosed drawings, in which FIG. 1 is a perspective view of a cellular section according to the invention, FIG. 2 is a perspective view of a modified embodiment of a cellular section having a large number of cells, FIG. 3 is a perspective view showing how a cellular section according to FIG. 1 is intended to be mounted into a vehicle bumper, FIG. 4 is a cross section of the bumper in FIG. 3, showing a cellular section in mounted position, and FIG. 5 shows the beam of the bumper in FIG. 3.

Figure 1:
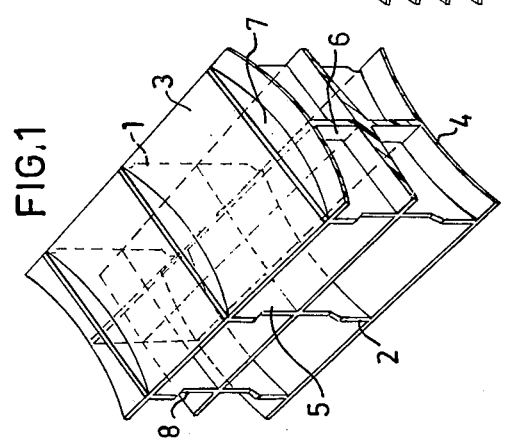

The cellular section exemplified in FIG. 1 has a substantially parallelepiped shape but is shown with cut ends in order to reveal a cellular structure in the cellular section. The longitudinal limits of the cellular section consists of a rear support side 1, a forward impact side 2 and an upper and a lower guide surface 3,4. The cellular section is provided with a number of transverse cells between the support side 1 and the impact side 2, which sides together define the width of the cellular section. The cells have rectangular cross sections and extend axially parallel in a direction perpendicular to the support side 1 in the cellular section, adjacent cells having at least one common side wall. The cells are arranged in a crossruled pattern in the exemplified cellular section, whereby a side wall common for two separate but adjacent cells constitutes a portion of a vertical separating wall 5 which extends across the cellular section.

The cellular section is provided with an inner longitudinal wall 6 in a position between the support side 1 and the impact side 2, said inner wall constituting a common bottom wall for cells opening out backwards towards the support side 1 and cells opening out forwards towards the impact side 2. In the embodiment shown in FIG. 1 the longitudinal inner wall 6 is arranged in the middle of the width of the cellular section, whereby the cells opening out forwards towards the impact side 2 have the same depth as the cells opening out backwards towards the support side 1. The inner wall 6 between two cells extending in the same axial direction is preferably flat on both sides but, according to the inventive idea, the bottom of the cells can have another shape, for instance, wall 6 can be perforated.

Both the upper and lower guide surfaces 3,4 have a concave shape in the transverse direction across the total width of the cellular section, whereby the cellular section obtains a substantially symmetrical hourglass-shaped cross section profile. This results in that the cross section area of the cells adjacent to these surfaces is successively reduced in a direction towards the bottom wall 6.

The cellular section is provided with a number of transverse ribs 7 which extend between the respective upper longitudinal edges of the support side 1 and the impact side 2 and between the respective lower longitudinal edges of the same sides, said ribs separating the transverse concavenesses of the guide surfaces 3,4 from each other. Said ribs 7 constitute an outer extension at the guide surfaces 3,4 of the previously mentioned separating walls 5. The ribs of the separating walls 5, together with the edge lines of the support side 1 and the impact side 2, provide the cellular section with a substantially rectangular transverse profile.

For purposes of adaption to a known bumper, the impact side 2 in the exemplified embodiment is provided with a longitudinal open recess 8 which is intended to constitute a guide for a protective casing (not shown here) or the like which encases the cellular section.

FIG. 2 shows a cellular section having a large number of cells which are arranged in a crossruled pattern, said cellular section being provided with an inner longitudinal wall 9 in the same manner as in the cellular section according to FIG. 1, said inner wall 9 constituting a common bottom for cells opening out towards a longitudinal rear support side 10 and cells opening out towards a longitudinal forward impact side 11. Said embodiment is shown in order to illustrate how a cellular section according to the invention can constitute one single shock absorbing unit with or without a protective casing. In such use the cellular section is intended to abut with its support side 10 a rigid surface, said rigid surface comprising, for example, a beam or the like to which the cellular section is fastened by means of conventional fastening means (not shown here).

The cellular section can also be designed to constitute a portion of a bumper on or for vehicles, whereby the cellular section is designed to at least cover the width of the vehicle in order to absorb impact. The shape of the cellular section can vary to a great extent within the scope of the inventive idea, depending on the various areas of use and measures of expediency used in order to achieve a shock absorbing unit or covering.

In the use of cellular sections in bumpers for vehicles as shown in FIGS. 3-5, a number of cellular sections according to FIG. 1 are designed as insert units 12 so as to fit into pocket-like recesses on a longitudinal beam 13. The beam is made of press-moulded sheet metal and has a U-shaped cross section wherein both shank edges are bent double so as to obtain increased rigidity. Two stays 16,17 are welded onto the back side of the beam 13, by means of which stays the beam 13 can be horizontally attached to the front or rear end of a vehicle. Furthermore, both ends of the beam 13 are bent in order to follow the curvature of the vehicle body.

The support surface of the insert units 12 abuts the inside of the web of the beam 13 and extends outside of the beam profile. The insert units 12 and the beam 13 are surrounded by an elastic protective casing 14 which has a substantially four-sided, ring-shaped cross section and has an open longitudinal slot in its back side. The shape and elasticity of the protective casing makes easy assembly possible in that the protective casing 14, by means of stretching, can be caused to grip the entire length of the beam 13 and therewith encompass the insert units 12. After being stretched onto the beam, the protective casing 14 is secured to the beam 13 by means of a rear locking rim 15 and conventional fastening means.

Cells which open outwardly in the transverse direction of the cellular section are obtained by means of the above-exemplified construction of a cellular section according to the invention. Such a construction makes possible the use of a simple moulding process when the cellular sections are being manufactured.

The cellular section is intended to absorb shocks coming from a direction which is substantially perpendicular to the impact side 2. An impact results in deformation of the cellular section, said deformation always being urged towards the middle of the cellular section because of the concave form of the guide surfaces 3,4, that is, through impact, the cellular section is subjected to a buckling which attempts to further bend the guide surfaces 3,4 towards each other. However, movements which are detrimental to the cellular section are counteracted by the presence of the inner wall 6 and the ribs 7.

The advantage of allowing the deformation of the cellular section to be controlled as described above is made especially clear when the cellular section is fitted into a supporting U-beam, the flanges of which to a certain extent cover the cellular sections in a manner illustrated in FIG. 3. By means of the deformation being urged to take place towards the middle of the cellular section, the risk that the portion of the cellular section which is situated outside of the flanges of the beam will swell up around the edges of the flanges and form bulges during deformation which, in turn, results in that the portion of the cellular section situated inside the flanges cannot fully participate in the absorption of the shock force, is reduced. In other words, the controlled deformation process ensures that the entire cellular section is used for absorbing deformation force. The cellular sections are intended to be manufactured of an elastic or plastic material, preferably of an elastic material such as for instance rubber, which makes it possible for the cellular section to, after a minor shock-absorbing deformation, return to its original shape.

The present invention is not restricted to the embodiment exemplified above. Rather, the cellular sections can, within the scope of the following claims, be modified into alternative embodiments, whereby the cellular sections can be designed to be supported by both curved and flat bases. The cellular sections according to the invention can be adapted to be used as impact protection on and for vehicles, boats, guard rails for roadways or anywhere where shock absorption is desired.

What I claim is:

1. In an energy absorbing vehicular bumper having an elongated support beam the improvement comprising shock absorbing means having a support side facing the beam and an impact side facing away from the beam, the shock absorbing means being in the form of a mass of semi-elastic material shaped to form a plurality of adjacent parallel open-ended cells extending transversely of the beam, each of the cells having at least one common side wall with an adjacent cell, the mass of semi-elastic material also forming an internal wall located intermediate and coextensive with the support side and the impact side of the shock-absorbing means, said internal wall constituting a common bottom wall for all of the cells whereby cells on one side of the internal wall open only at said support side and whereby cells on the other side of the internal wall open only at said impact side.

2. A bumper as in claim 1 wherein said internal wall is located midway between said support side and said impact side so that the cells which are open at said support side are of the same depth as the cells which are open at said impact side.

3. A bumper as in claim 1 wherein said shock absorbing means has upper and lower concave walls formed by said semi-elastic material and extending from said support face to said impact face.

4. A bumper as in claim 3 including ribs projecting from said upper and lower concave walls and extending parallel to said cells.

5. A bumper as in claim 4 wherein there are upper and lower cells formed by said semi-elastic material and wherein there are separating walls extending between said upper and lower walls, said separating walls having extensions which form said ribs.

6. A bumper as in claim 1 wherein said semi-elastic material is rubber.

* * * * *